United States Patent

[11] 3,573,470

| [72] | Inventor | Floyd C. Haley |
| | | La Canada, Calif. |
| [21] | Appl. No. | 716,885 |
| [22] | Filed | Mar. 28, 1968 |
| [45] | Patented | Apr. 6, 1971 |
| [73] | Assignee | California Institute of Technology |
| | | Pasadena, Calif. |

[54] PLURAL OUTPUT OPTIMETRIC SAMPLE CELL AND ANALYSIS SYSTEM
15 Claims, 8 Drawing Figs.

[52] U.S. Cl............................................. 250/218,
250/227, 250/239, 356/208
[51] Int. Cl...................................................... G01n 21/26,
G02b 5/14, H01j 5/02
[50] Field of Search....................................... 250/218,
239, 227; 356/207, 208, 246; 350/195

[56] References Cited
UNITED STATES PATENTS

| 298,469 | 5/1884 | Hornig | 356/208 |
| 1,969,627 | 8/1934 | Simon et al. | 356/207 |
| 2,977,479 | 3/1961 | Lauer | 250/218 |
| 3,382,762 | 5/1968 | Vasel et al. | 250/218 |
| 2,590,827 | 3/1952 | Stamm et al. | 250/218X |
| 2,632,114 | 3/1953 | Silvertooth | 250/43.5 |
| 2,699,399 | 1/1955 | Armistead | 350/195 |
| 2,731,877 | 1/1956 | Clamann | 250/43.5X |
| 2,873,644 | 2/1959 | Kremen et al. | 250/218X |
| 3,202,826 | 8/1965 | Greathouse | 250/218X |
| 3,231,748 | 1/1966 | Haessler et al. | 250/218X |
| 3,398,286 | 8/1968 | Ford et al. | 250/218X |

Primary Examiner—James W. Lawrence
Assistant Examiner—T. N. Grigsby
Attorneys—Samuel Lindenberg and Arthur Freilich ABSTRACT: Apparatus suitable for receiving a sample for optimetric analysis along with a method of fabricating the apparatus is disclosed. The apparatus includes a sample cell comprising an opaque hollow tubing. A plurality of apertures are defined in the wall of the tubing and a lens barrel which extends beyond the opposite surfaces of the wall is supported within at least one of the apertures. A glass lens is mounted in the lens barrel. A housing is provided with a first channel for receiving the sample cell and a further series of channels extending from the exterior of the housing to the sample cell apertures. A filter element is housed in each of these latter channels. These channels also slidingly receive an excitation light source or a photodetector cell to permit selective focusing thereof. A sample cell containing at least three apertures in the walls thereof can be mounted for rotation relative to a light source or photodetection means for simultaneous or alternate optimetric determination of the components of a single sample. The sample cell is fabricated by supporting a lens barrel within the aperture. A molten portion of glass is deposited in the lens barrel and cooled while in a horizontal position to form a lens having an acceptable angle of 130° to 170° at an aperture of f7 or below.

Patented April 6, 1971  3,573,470

INVENTOR.
FLOYD C. HALEY
BY Lindenberg Freilich
ATTORNEYS

Patented April 6, 1971
3,573,470
3 Sheets-Sheet 2
FIG. 3
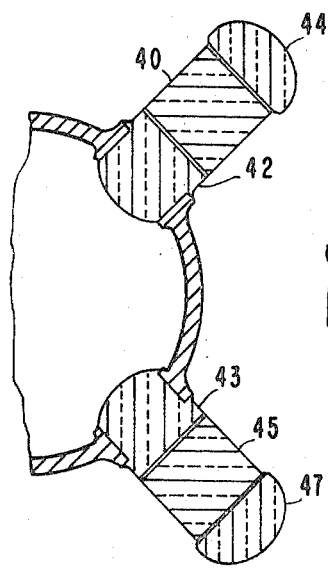
FIG. 4
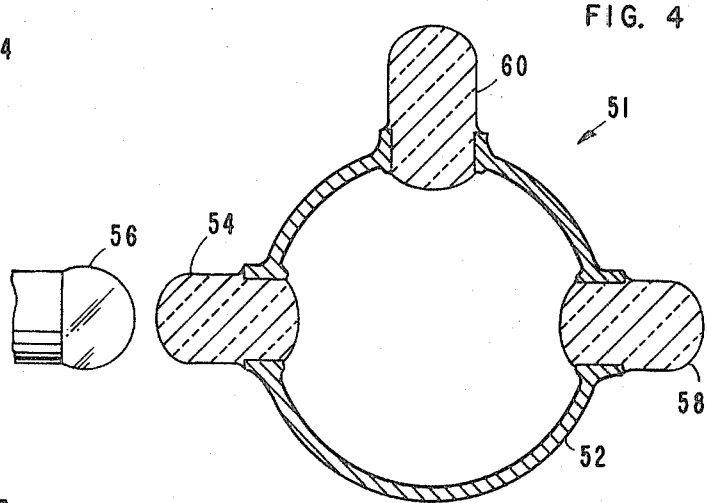
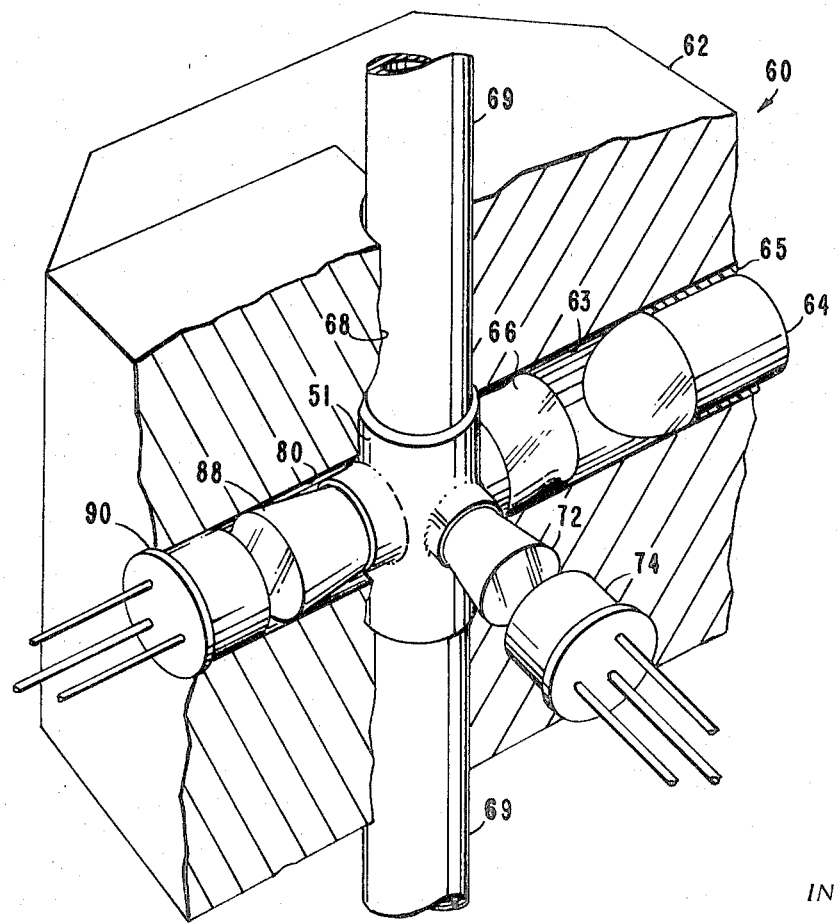
FIG. 5
INVENTOR.
FLOYD C. HALEY
BY *Lindenberg & Freilich*
ATTORNEYS Patented April 6, 1971

*INVENTOR.*
FLOYD C. HALEY
BY *Lindenberg & Freilich*

ATTORNEYS

PLURAL OUTPUT OPTIMETRIC SAMPLE CELL AND ANALYSIS SYSTEM

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

1. Field of the Invention

The present invention relates to optimetric systems and more particularly to an optimetric sample holder and a method of fabrication thereof.

2. Description of the Prior Art

Many methods and devices are known for analyzing material samples employing optimetric colorimetric or fluorimetric techniques. These devices, however, are generally complex in nature, involve intricate fabrication of bulky apparatus and are not capable of withstanding severe environments such as may be encountered in outer space. The present and future efforts to explore the chemical constituents of the atmosphere and soil of outer planetary bodies require instrumentation that is compact, and is capable of performing reliably and accurately in diverse environments.

OBJECTS AND SUMMARY OF THE INVENTION

In view of the foregoing, it is an object of this invention to provide an efficient and compact system for analysis employing optimetric devices.

A further object is to provide a micro-optical measurement system particularly well suited for lunar, planetary and space explorations and studies of biological or soil samples.

A still further object of the invention is to provide a method of fabricating a sample holder for use in colorimetric and fluorimetric determinations.

Yet another object of the invention is the provision of a method of fabricating lens formula shaped windows in the walls of sample holder tubing.

A still further object of the invention is the provision of compact, unitary optimetric system capable of fluorimetric, colorimetric and absorption determinations.

These and other objects of the invention will become apparent as the description proceeds.

In accordance with the invention, the sample holder comprises a hollow tubing containing a substantially opaque wall. A plurality of apertures are defined in the wall of the tubing and an annular ring which extends beyond the surfaces of the wall is supported within at least one of the apertures. A lens element is mounted within the ring.

Housing means are provided for positioning the apertures of the sample holder in variable spaced relation to input light excitation means and to output light detection means. The input light source includes means for monochromatizing the input radiation to a selected wavelength which is selectively absorbed by a component of the contents of the sample holder. The light output detection means detects the light that is transmitted through or emitted by the component and develops a signal characteristic of the presence of and/or proportional to the concentration of the component.

A sample holder with multiple output apertures mounted with each output aperture in light viewing access to light output detection means permits simultaneous colorimetric and fluorimetric measurement. The sample holder with multiple apertures can be mounted for selective positioning for alternate colorimetric or fluorimetric determinations.

The sample receptacle which can be in the form of a flow through sample holder is fabricated by providing a plurality of apertures in the walls of a length of substantially opaque tubing. A ring member extending beyond the surfaces of the wall is supported in at least one aperture.

A lens formula shaped window is formed by depositing a measured molten portion of optical glass within the ring and cooling the glass to form a lens-shaped element. These lenses may be clear for direct light focusing or colored for filter applications.

DETAILED DESCRIPTION OF THE DRAWINGS

The invention will now become better understood by reference to the following detailed description when considered in connection with the accompanying drawings in which:

FIG. 3 is a further embodiment illustrating a filter element integrally disposed between two lenses, one of the lenses being mounted in the sample tube holder wall;

FIG. 4 is a cross-sectional view of a three-aperture sample tube holder for simultaneous colorimetric and fluorimetric analysis;

FIG. 5 is a perspective view of a housing for the sample holder;

Figure 1:
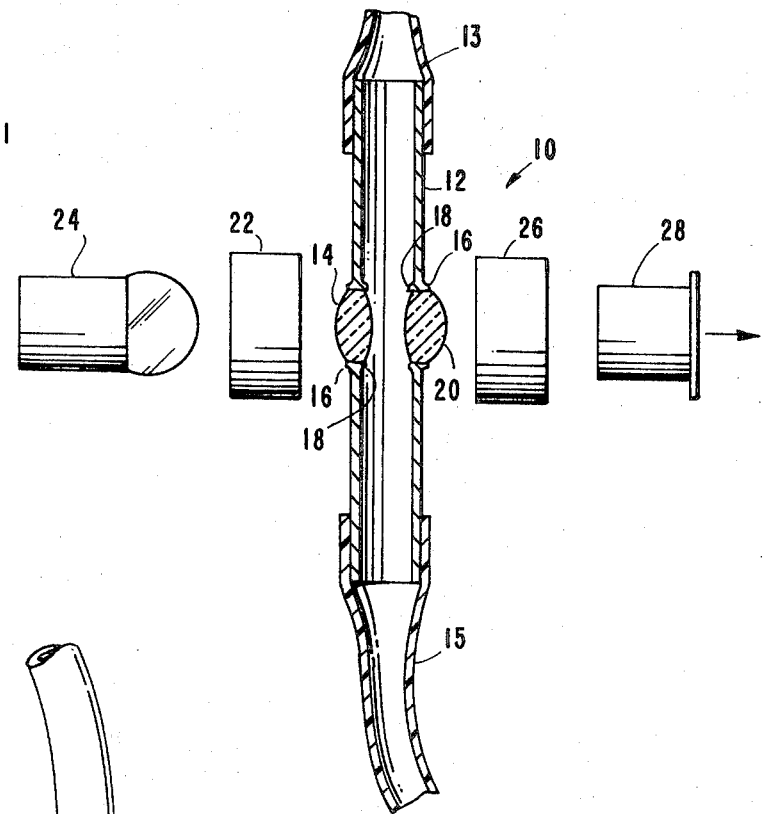
FIG. 1 is a sectional view of a first embodiment of a dual aperture sample cell according to the invention with integral lenses and separate filters.

Referring now to FIG. 1, a flow through sample cell 10 is formed from a small diameter thin-walled metal tube 12. As illustrated, the tubing is of circular cross section, but may also be elliptical, rectangular or other shape. Sample or standardization fluid is delivered to the cell through plastic tubing 13 and is exhausted through tubing 15. Suitable tubing such as those formed of vinyl resins are chemically inert to the components of the sample material. The tubing 13 and 15 surrounds the ends of the sample cell. A first light-gathering lens 14 for focusing input light is mounted in the metal tube 12 within a first aperture encased in an annular lens holder. The holder extends on each side of the wall of tube 12 to form an exterior projecting flange 16 and an interior facing flange 18. A radiation output lens element 20 is mounted on a light viewing axis to output radiation on a further wall portion of the metal tube within a second aperture supporting an annular ring holder having said exterior and interior flanges 16 and 18.

The metal tube 12 is preferably formed of a high melting point, nonoxidizable material such as platinum which molten glass will readily wet without forming metal oxides so that a good sealing bond may be formed between the glass and the metal. This allows the molten glass to flow readily to form a lens formula shape. Minute lenses can be formed according to the technique of the invention having a perfect lens formula. The tubing can be very small and, in fact, platinum tubing having one-eighth inch outside diameter down to one-sixteenth outside diameter has been utilized to form sample cells according to the invention.

The lenses are mounted in the walls of the sample tube by forming a lens-receiving aperture of the desired diameter. It is preferred to mechanically scribe the hole in the thin wall tubing so that metal protrudes both within and without the wall of the tubing. This forms an annular ring which serves as a lens barrel for holding the glob and further prevents the molten glass from creeping along the inner and outer walls of the tube once it has been applied to the aperture. The length of the lens barrel also contributes to accurately and selectively determining the focal length of the lens.

A portion of glass is melted and placed in the lens barrel which is held in a horizontal position. The glass wets the entire inner surface of the lens barrel and a meniscus shape forms below. More accurate control of lens shape and focal length is achieved by weighing out the proper portion of glass to be used. The glass is allowed to slowly cool from the molten state while held in this horizontal position. The surface tension provided by the air to glass interface is believed to create a force which acts on a monomolecular layer of the glass surface. This force determines the curvature of the lens surface and serves to maintain the shape of the lens while it cools to a nearly perfect and smooth form. The actual shape may be calculated very accurately since the surface tension is constant over the entire area.

In the meniscus lens of the invention, the focal length varies from the center to the edge to form a planar image. The lens has a wide acceptable angle of over 130° to 170° at a wide aperture of f7 and below. It is extremely difficult to grind small lenses to the degree of lens quality achieved by this technique. The method of the invention is particularly effective in forming lenses in situ in apertures on curved surfaces such as cylindrical tubing.

In order to form a lens of the desired shape, it is necessary that the lens holder provides no wettable surface normal to the axis of the lens. Otherwise, the molten glass under the impetus of surface tension will creep sideways along the surface an indeterminable amount and the final shape will vary irreproducibly. A lens barrel having a glass retaining sidewall only permits surface shaping at the air to glass interface. Another suitable lens holder is a ring of wire having no appreciable lateral thickness. Thus, the molten glass metal interface will have no appreciable effect on the meniscus formed at the glass to air interface.

Meniscus-shaped lenses can be formed in a wire ring holder according to the static method discussed above. The shape can also be controlled by dynamic rolling of the ring holder or sleeve during cooling of the molten glass. For example, the sleeve containing a portion of molten glass may be placed in a horizontal quartz tube which is rolled during cooling. Surface tension will still determine the shape of the surface exposed to air. The lens element shape can be varied from concave to convex depending on the volume of glass applied to the lens holder. It is not necessary to match the coefficient of expansion of the metal ring and the glass. If the metal breaks, it is simply peeled away and the lens can be mounted by mechanical means. If the metal remains, it can be used to mount the lens to a support by soldering, brazing or other suitable adhesion or attachment process.

The lenses are of great value when used in systems requiring accurate imaging such as in direct view fluorimetry. In many applications, however, accurate imaging is not necessary, the prime requirement being efficient collection and transmission of light into and from the light absorbing and fluorescing materials.

The lens may be formed from clear glass such as soda-lime glass or may include appropriate coloring materials for formation of a combination lens-filter element. As illustrated in FIG. 1, clear glass has been used to form the lens and separate filter elements are utilized. An input filter 22 is positioned between the input lens 14 and a light input lamp 24 and an output filter 26 is positioned between the output lens 20 and the photodetector 28. A signal proportional to transmitted light detected by the photodetector is generated in the data collection circuit (not shown) and is recorded or displayed.

The lens-forming technique of the invention permits the formation of colored lenses for built-in filter forms. The glass can be colored by mixing in appropriate coloring materials or desired transmission characteristics can be achieved by mixing colored filter glass such as Corning filter-grade glasses into the melt. Two or more lens segments of different color may be utilized to form a composite lens for the filter segment can be fused directly to the lens and outside wall of the sample cell.

Figure 2:
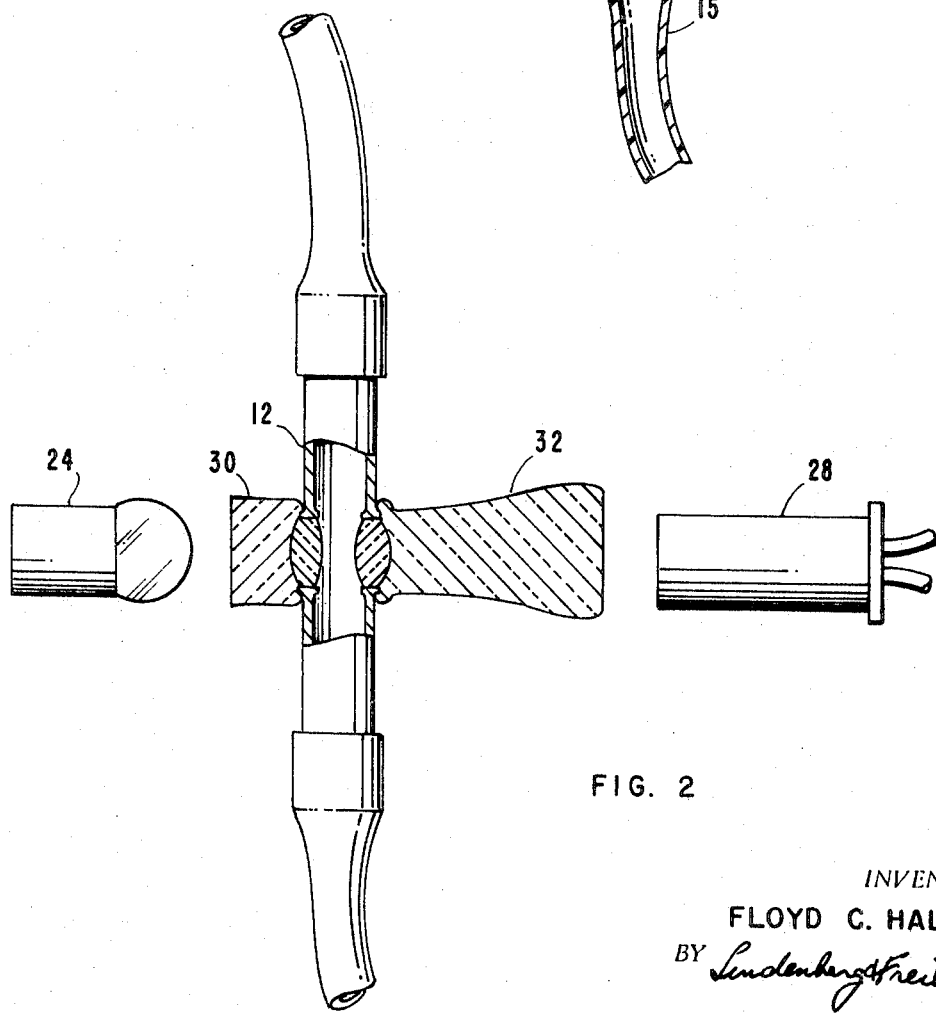
FIG. 2 is a sectional view of an alternate embodiment with integral filters and light pipes attached to the lenses.

Referring now to FIG. 2, a modified form of the sample holder is shown in which an input filter 30 has been attached to the input lens and to the wall of the metal tube and an output filter 32 has been attached to the output lens and the adjacent area of the metal tube 12. As shown in this embodiment, the filter 32 is substantially elongated in order to provide light-piping effects. The sample holder assembly as shown can be inserted into the remote and inaccessible areas.

For example, a sample holder with attached input and output light pipes can be inserted into the body at the location of the suspected site of trauma. Light is piped into the body fluid to be monitored and the output light piped out of the body to the detector. In instrument design, more flexibility in placement of components is permissible. The lamp can be remote from the sample holder and thereby avoid the heating effect on the sample. This eliminates the necessity to cool the sample or to temperature-calibrate the data.

A composite lens-filter element is illustrated in FIG. 3. In this embodiment, a cylindrical filter element 40 such as one composed of ultraviolet transmitting glass is interposed between the lens element 42 mounted within the wall of the tubing and a further lens element 44 mounted at the other end of this cylinder 40. These elements can be joined by optical cement. However, it is preferred to fuse them together since a glass-to-glass fused bond is more stable in the environments encountered in outer space and those encountered on other planetary bodies. On the output side of this sample holder, the lens element 43 mounted in the wall of the tubing is formed from clear glass. The filter cylinder 45 is composed of an ultraviolet absorbing-visible light transmitting glass while the lens element 47 mounted on top of the filter cylinder 45 is a combination lens and cutoff filter formed from yellow glass.

In the quantitative or qualitative determination of multiple components in a single fluid separate excitation wavelengths and separate output wavelengths may be required. For example, in the determination of creatine in urine from the absorption band of creatinine picrate, a characteristic absorption band of about 480μ is to be monitored by colorimetry. In the fluorimetric determination of calcium in urine, excitation radiation at about 490μ results in fluorescent emission at about 520μ. Fluorimetric transmission measurements can be made straight through. However, fluorimetric output can also be measured at other angles to the incident light and in the normal position more stray light can be eliminated. This permits simultaneous or alternate measurements to be made with the optimetric device of the invention.

Referring now to FIG. 4, a cross section of a sample tube holder 51 for simultaneous creatine and calcium urine analysis is shown. The sample holder 50 comprises a tube 52 including three apertures. The first aperture includes a light gathering input lens element 54. An incandescent light source means 56 is mounted in front of the input lens 54. In line with this incident radiation is a second aperture housing colorimetric output lens 58 for receiving the characteristic creatinine picrate radiation output. A third aperture provided normal to the incident light receives lens element 60 for detecting the calcium fluorimetric radiation output.

Referring now to FIG. 5, the sample holder 51, the filters, light source and photodetector cells, are adjustably positioned in the desired relation within a housing 60. The housing 60 is preferably formed in two parts which can be disengaged for interchanging the various elements. Each section 62 of the housing is of general rectangular shape and includes a first cylindrical recess 63 for receiving a lamp 64. The base end of the lamp 64 is covered with a sleeve 65 of a heat resistant plastic such as Micarta to form a close fit with the recess, but permit axial sliding focusing of the bulb. The diameter of the recess is selected to receive an input filter element 66 which may be fused directly to the sample holder 51.

The inside terminus of the recess 63 is intersected with a perpendicular channel 68 for receiving the sample holder 51 and inlet and outlet tubing 69. A further channel, not shown, is provided in the other section of the housing 60 normal to the sample holder 51 for receiving a fluorimetric filter 72 and photodetector cell 74. The cell 74 is also surrounded with Micarta to form a close fit with the channel.

A third channel 80 is provided in the housing in line with channel 63 and this channel 80 receives the colorimetric output filter 88 and photodetector cell 90.

To perform analyses with the optimetric instrument of FIG. 5, the appropriate filters are placed in the input and output channels and the sections of the housing are assembled around a sample holder with the lens apertures in the correct orientation. The bulb and the cells are focused and the inlet and outlet tubing are attached to a pump and a waste receptacle (not shown). The instrument can be operated in a single beam mode whereby a standard solution is first passed through the sample holder and the data collection and analysis system calibrated and set to a reference level. A metered sample of urine and reagent is then pumped through the sample holder to displace the standard solution and optical measurements can be made simultaneously or alternatively to determine the quantity of creatine and calcium in the urine sample. The instruments of FIGS. 4 and 5 may also be utilized to simultaneously obtain both colorimetric and fluorimetric output from a single substance. This is practical in most cases since the same input wavelength is absorbed for colorimetry and excites the substance to emit a fluorescent output.

Figure 6:
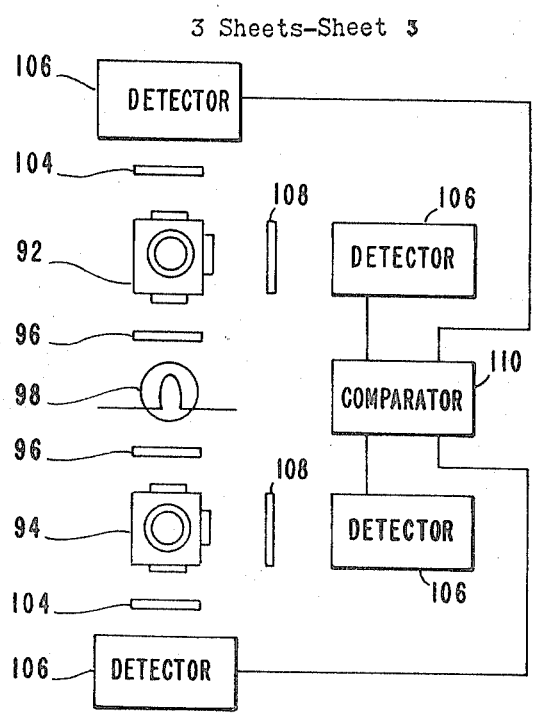
FIG. 6 is a block diagram of an optimetric system for quantitatively determining the constituents of a sample according to the invention.

A double-beam mode of utilizing the sample holder of the invention is illustrated in the block diagram of FIG. 6. The sample test cell 92 contains the materials to be analyzed while the reference cell 94 contains standard solutions of the desired component. Narrow band source filters 96 establish a particular spectral output from the light source 98 into the sample cell 92 and reference cell 94. In-line output filters 104 further narrow the colorimetric output before collection on the photodetector cells 106. Normal mode fluorimetric output filters 108 perform the same function.

The photodetectors 106 such as cadmium sulfide phototubes act to convert the emitted and received light into electrical signals which are transmitted from the sample and reference photocells respectively to a comparator 110 wherein the difference in intensity is measured to give a direct indication of the quantity of the substance contained in the sample fluid being analyzed.

Figure 7:
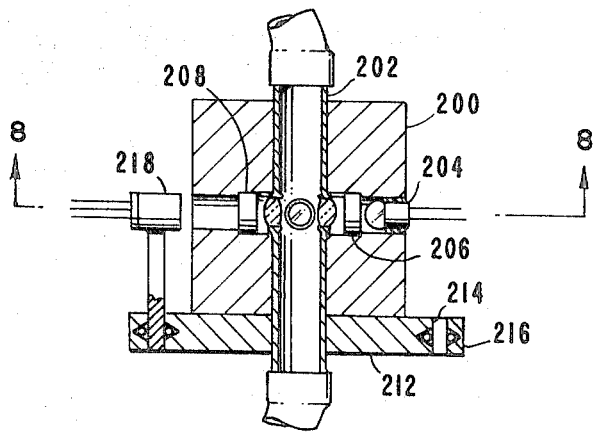
FIG. 7 is a sectional view of an optimetric system including means for selectively positioning the light source and/or photodetector.
Figure 8:
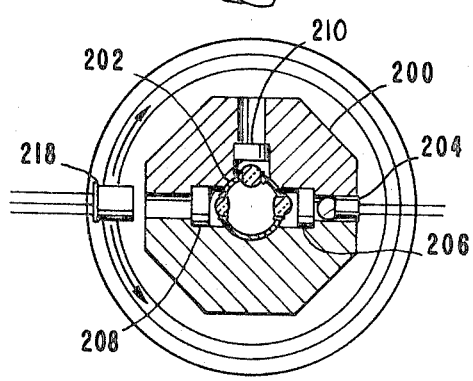
FIG. 8 is a view taken along line 8–8 of the embodiment of FIG. 7.

A further optimetric system for multiple optimetric determinations is illustrated in FIGS. 7 and 8. In this device alternate determinations can be run by positioning a detector from a position in line to the incident radiation to a position normal thereto. A housing 200 receives a sample cell 202 having at least three apertures. The first aperture channel includes a light source 204 and source filter 206. The second and third channels include output filters 208 and 210 respectively.

The housing is mounted on a stationary base 212 which has an outer bearing grooved perimeter 214. A rotatable platform 216 surrounds the perimeter. A photodetector cell 218 is mounted on this platform for selective positioning in front of the two output channels. Since the filters are in place, the desired output is being provided and all is required is the selective positioning of the photocell in line with the output channel being monitored.

The same versatility is provided by mounting a detector on the stationary housing and selectively positioning a light source from a position in line with an incident light aperture channel containing a first selected band-pass filter to a position in line with an aperture channel normal to the first incident light channel or to some other positioned aperture. The second channel contains a selected band-pass filter to pass radiation characteristically absorbed by a second component of the sample. Other variations are possible. In another arrangement, the housing contains the sample holder and two sets of straight-through light channels, each with selected narrow band-pass input and output filters. A light source and an in-line photodetector cell are mounted for relative movement with respect to the housing. The light source and photocell are selectively positioned in line with the first channel and a reading obtained and then moved to the second channel.

The optimetric system of the invention can be fabricated very simply into a compact, effective and reliable device for the measurement of transmission and/or absorption of particular wavelength light and/or the fluorescent output wavelength of optically excited species. The system of the invention will find application in the medical, pharmaceutical, paint and industrial chemical fields and in general laboratory and school use. The system is particularly applicable to microanalyses and especially for micro-optical measurements in lunar, planetary and space studies of biological, soil or atmosphere samples.

It is apparent that only preferred embodiments of the invention have been disclosed and that numerous modifications, substitutions and alterations are permissible without departing from the scope of the invention as defined in the following claims.

I claim:

1. In a sample cell for receiving material for optimetric analysis, the improvement comprising:
    a hollow tube comprised of a substantially opaque wall and formed of a nonoxidizable metal readily wettable by molten glass, said wall defining at least a first aperture therein;
    a cylindrical lens barrel integral with said wall, consisting of aperture forming wall material supported within said aperture and extending beyond opposite surfaces of said wall; and
    a meniscus-shaped, wide-angle glass lens forming a direct glass-to-metal seal with the walls of said lens barrel.

2. A sample cell according to claim 1 wherein said wall defines a second aperture aligned with said first aperture, and a third aperture normal thereto.

3. A sample cell according to claim 1 in which the glass forming the lens is selectively colored for passing a narrow band-pass of radiation.

4. A sample cell according to claim 1 including a narrow band-pass filter and means attaching said filter to said lens.

5. A sample cell according to claim 1 including a light pipe and means attaching said light pipe to said lens.

6. A method of forming an optimetric fluid sample holder comprising the steps of:
    forming at least one aperture in the wall of a metal tube formed of a nonoxidizable metal readily wettable by molten glass;
    melting a portion of optical glass;
    placing the molten glass in the aperture;
    holding the tube horizontal to form a meniscus-shaped lens within the aperture; and
    cooling the glass to form a metal-to-glass seal with the wall of the tube.

7. A method according to claim 6 in which a cylindrical lens holder comprising a sleeve of metal formed of an integral portion of the metal of the wall of the tube is disposed in said aperture and receives said lens.

8. A method according to claim 7 in which the lens holder is dynamically rolled during cooling of the molten glass.

9. In an optimetric sample receiving unit for receiving a material to be optimetrically quantitatively analyzed comprising an opaque container having a light input aperture and a light output aperture in the walls thereof; means for radiating characteristic, narrow-band excitation radiation to said input aperture including a lamp and a narrow band pass input absorption filter; and means for detecting characteristic radiation from said output aperture including a narrow-band pass, output absorption filter and a photodetector cell; the improvement comprising:
    housing means defining an axial recess for receiving said container, a first, radial recess in communication with said light input aperture for receiving said lamp and input filter; and a second, radial recess in communication with said light output aperture for receiving said photodetector cell and output filter; and band means surrounding a portion of said lamp and said photodetector cell for providing a sliding, adjustable fit of said lamp and said cell with the inside surface of said second and third recesses.

10. In an optimetric system for combined colorimetric and fluorimetric, quantitative analysis including a container for receiving a material for analysis including at least three radiation transparent apertures in the walls of said container with first and second of said apertures in alignment and the third aperture being normal thereto; means for radiating a selected band-pass of excitation radiation which is selectively and characteristically absorbed by said material; first detection means for detecting a selected band-pass at longer wavelength than said excitation radiation of fluorescent emission radiation from said material; and second detection means for detecting a selected band-pass of the excitation radiation absorbed by said material; the improvement comprising:

housing means for mounting said container;

rotatable support means surrounding said housing means supporting at least one of said means for radiating, and detection means; and means for selectively rotating said support for selectively positioning said means for radiating and said detection means in alternate positions with respect to said apertures whereby the means for detecting and said first detection means are in communication through said first and second apertures during colorimetric analysis and said means for radiating and second detection means are in communication through said first and third apertures during fluorimetric analysis.

11. An optimetric system according to claim 10 in which said housing means includes a first recess for receiving said means for radiating in communication with said first aperture; a second recess in communication with said second aperture for receiving said first filter; a third recess in communication with said third aperture for receiving said second filter and said detection means includes a single photodetector cell mounted on said rotatable support for selective positioning in communication with each of said second and third apertures.

12. In an analytical system for producing colorimetric and fluorimetric photoelectric outputs characteristic of particular constituents in a fluid to be analyzed, said system including a sample container, excitation radiation means and photoelectric detection means, the improvement comprising:

a sample container for receiving said fluid defining a plurality of apertures transparent to characteristic input and output radiation, said apertures including an input aperture, a first output aperture in line therewith and a second output aperture normal thereto;

excitation means for radiating a selected band-pass of excitation radiation to said input aperture which is selectively and characteristically absorbed by a component of the fluid sample;

first colorimetric photoelectric means including a first narrow band-pass filter receiving the radiation output from said first output aperture for determining the quantitative colorimetric absorption of said excitation radiation by said component; and second fluorimetric photoelectric means including a second narrow band-pass filter at a longer wavelength then said excitation radiation for detecting the characteristic fluorescent emission of a component of said sample.

13. A system according to claim 12 in which light-gathering lenses are mounted and sealed in at least one of said apertures.

14. A system according to claim 13 in which at least one of said lenses is colored for passing a selected band-pass of radiation.

15. A system according to claim 12 in which said fluorescent emission is in the ultraviolet range and said second narrow band-pass filter does not pass said excitation radiation.

UNITED STATES PATENT OFFICE
CERTIFICATE OF CORRECTION

Patent No. 3,573,470             Dated April 6, 1971

Inventor(s) Floyd C. Haley

It is certified that error appears in the above-identified patent and that said Letters Patent are hereby corrected as shown below:

Claim 9, last line, "second and third recesses" should read -- first and second recesses -- .

Signed and sealed this 27th day of March 1973.

(SEAL)
Attest:

EDWARD M. FLETCHER, JR.                ROBERT GOTTSCHALK
Attesting Officer                      Commissioner of Pa